March 20, 1956  A. W. JOHNSON  2,738,725
ACTUATING MECHANISM FOR FRUIT JUICERS OR THE LIKE
Original Filed Dec. 27, 1950  2 Sheets-Sheet 1
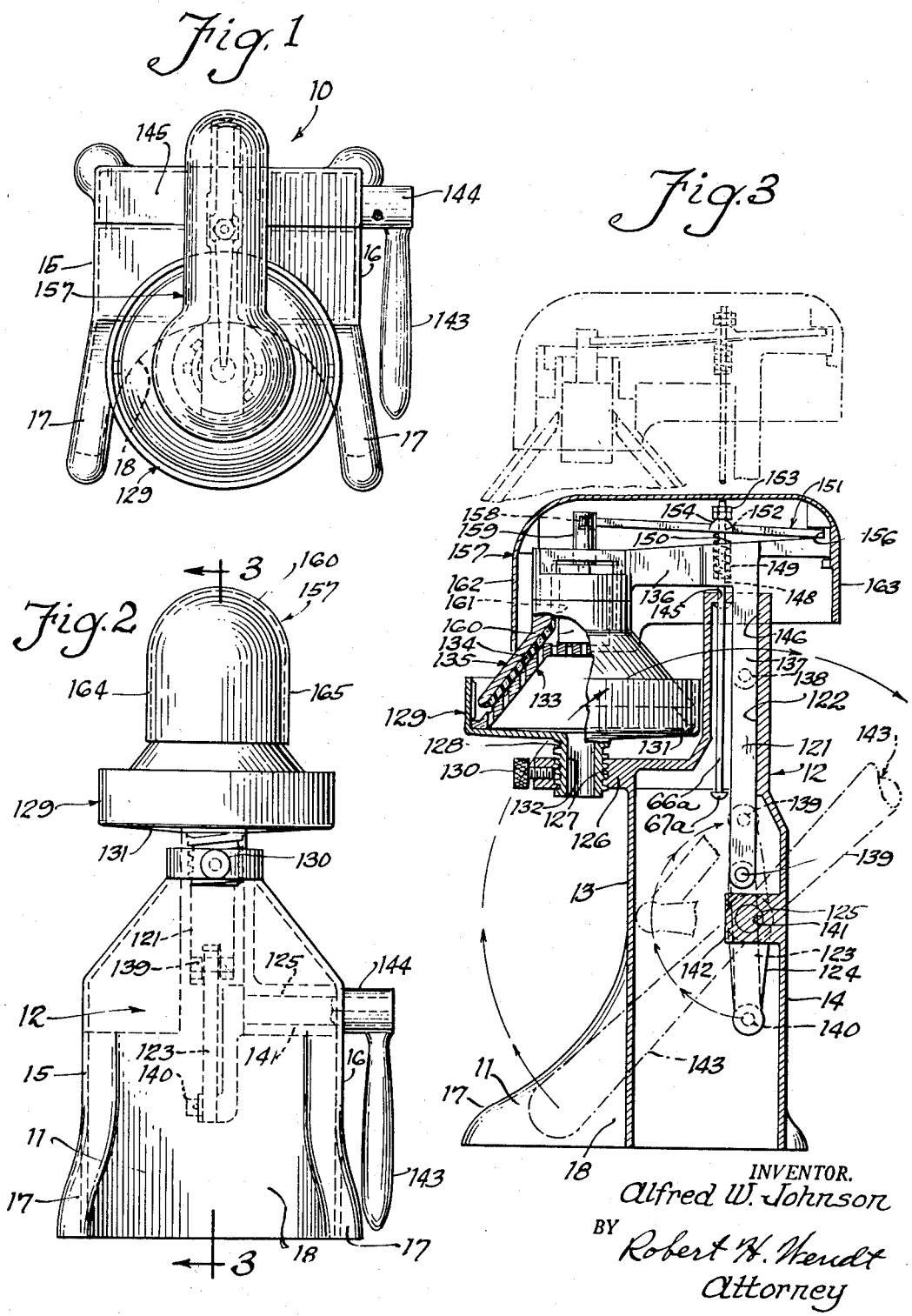
INVENTOR.
Alfred W. Johnson
BY Robert H. Wendt
Attorney March 20, 1956 A. W. JOHNSON 2,738,725
ACTUATING MECHANISM FOR FRUIT JUICERS OR THE LIKE
Original Filed Dec. 27, 1950 2 Sheets-Sheet 2
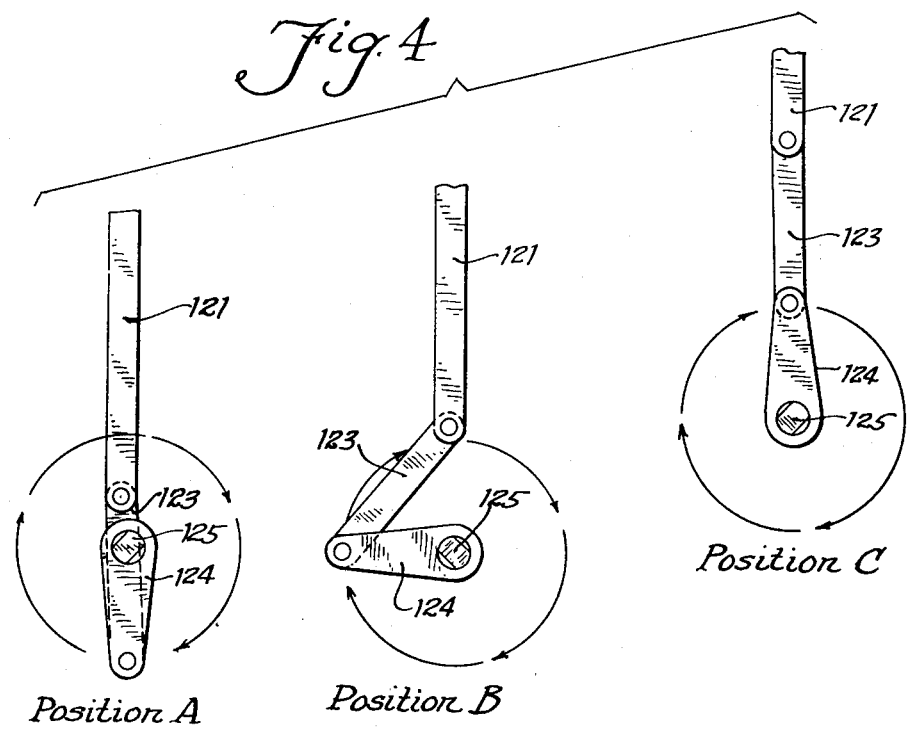
Inventor
Alfred W. Johnson
By Robert H. Wendt
Attorney

United States Patent Office 2,738,725
Patented Mar. 20, 1956

2,738,725

ACTUATING MECHANISM FOR FRUIT JUICERS OR THE LIKE

Alfred W. Johnson, Chicago, Ill.

Original application December 27, 1950, Serial No. 202,935, now Patent No. 2,624,271, dated January 6, 1953. Divided and this application December 30, 1952, Serial No. 328,683

2 Claims. (Cl. 100—218)

The present invention relates to actuating mechanism for fruit juicers and the like and is particularly concerned with a modified form of my mechanism disclosed, but not claimed, in my prior application, Ser. No. 202,935, filed December 27, 1950, Patent No. 2,624,271, issued January 6, 1953, of which this application is a division.

In the fruit juicers of the prior art of the type employing a rack and pinion it is necessary for the operator to spend a certain amount of time in twirling the handle of the pinion shaft in order to bring the pressure cup down into engagement with the fruit, after which he places pressure upon it; and again the handle must be turned a number of times in such prior art devices to separate the pressure cup of the juicer from the rind.

One of the objects of the invention is the provision of an improved fruit juicer having an improved actuating mechanism by means of which the handle is adapted to effect a maximum amount of motion of the pressure cup to bring the cup into engagement with the fruit, and thereafter to exert a maximum amount of force with a minimum amount of movement by means of the same handle, with the handle in the most convenient position for exerting force upon it.

Another object of the invention is the provision of an improved fruit juicer mechanism of the class described, which is also provided with means for ejecting the rind from the pressure cup at or adjacent the upper limit of its stroke.

Another object of the invention is the provision of an improved construction and mechanism for fruit juicers or the like by means of which the juicer may be operated more swiftly and with a minimum number of movements on the part of the operator, while still exerting a maximum pressure to extract the juice from the fruit and to remove the previously squeezed rind from the pressure cup.

Another object is the provision of an improved fruit juicer construction which is simple, sturdy, capable of economical manufacture, efficient, and adapted to be used for a long period of time without necessity for repair or replacement of any of its parts.

Another object of the invention is the provision of an improved mechanism for actuating fruit juicers or for other purposes, in which a handle is adapted to effect a maximum amount of movement during the beginning of its stroke from a rear position upward and over to a front position with a minimum amount of force to bring two working parts into quick engagement with each other, and thereafter to accomplish a minimum amount of movement, but with a maximum amount of force after the working parts have been brought into engagement with each other.

Other objects and advantages of the invention will be apparent from the following description and the accompanying drawings, in which similar characters of reference indicate similar parts throughout the several views.

Referring to the drawings, of which there are two sheets,

Fig. 1 is a top plan view of a fruit juicer embodying my invention;

Fig. 2 is a front elevational view;

Fig. 3 is a sectional view, taken on the plane of the line 3—3 of Fig. 2, looking in the direction of the arrows;

Fig. 4 is a movement diagram showing the respective positions of the parts in three different positions, to illustrate the points of maximum movement and points of maximum force.

Referring to Figs. 1–3, 10 indicates in its entirety a fruit juicer having an actuating mechanism embodying the invention. The fruit juicer may have a base 11 provided with an upwardly extending column 12, which is hollow and provided with a front wall 13, rear wall 14, and the two side walls 15 and 16.

The base may be provided with a pair of forwardly projecting arms 17, forming a U shaped recess 18 in the front for receiving a tumbler or other container for receiving the fruit juice. At its upper front end a forwardly extending arm 126 is provided for supporting the fruit juice cup 129.

The arm 126 has a threaded bore 127 provided with relatively coarse threads for adjustably receiving the threaded hub 128 of the fruit juice cup 129. The hub 128 may be locked in any adjusted position by means of a knurled set screw 130; and the fruit juice cup may be adjusted upward or downward by rotating it in the threaded bore 127.

The fruit juice cup 129 may comprise a substantially cylindrical cup provided with a slightly conical bottom 131 leading to a drain bore 132 extending through the hub 128. The juicer cup 129 supports a perforated cone 133, which is complementary to the sponge rubber lining 134 of an upper cone 135.

The upper cone 135 is carried by a forwardly projecting arm 136, which in turn is supported by a downwardly extending connecting rod 137 slidably mounted in a guide 122 in the upper end of the column 12. The connecting rod 137 is pivotally connected at 138 to the link 121, which in turn is pivotally connected to a second link 123 at the pivot 139.

The link 123 is pivotally connected at 140 to a crank 124, which is fixedly secured on stub shaft 125. Stub shaft 125 is rotatably mounted in a bearing 141 formed in a forwardly projecting lug 142 carried by the rear wall 14 of the column 12 and by the side wall.

The stub shaft 125 projects laterally from the column housing; and its end carries a forwardly extending handle 143, having a hub 144 fixedly mounted on the shaft.

The range of movement of the handle 143 is shown by the arcuate arrows in Fig. 3; and the parts of the mechanism are shown in the squeezing position, with the handle extending forwardly and downwardly at the end of its downward stroke. The upper dotted position of the handle 143 indicates its position when the upper juicer cone has been lifted to insert a new orange or similar fruit.

The upper end of the base 11, forming the guide 122, has its top wall provided with a top wall 145, which is provided with a guide aperture 146, which may be rectangular. The top wall 145 also has a round aperture for an ejector rod 66a, having a head 67a. The ejector rod extends upwardly through a bore 148 in the cone supporting arm 136 and through a counterbore 149, housing a helical coil spring 150.

The coil spring 150 bears against an ejector lever 151, which has a bore 152 for the ejector rod 66a. Nuts 153 on the ejector rod lever bear upon a rounded hump 154, forming a pivotal bearing for the ejector rod 66a and the ejector lever 151.

The right end 155 of the ejector lever is pivotally mounted in a socket 156 in the cover 157. The left end of the ejector lever 151 is pivotally mounted in a socket 158 in a hub 159 of the ejector 160.

The ejector 160 comprises a sliding plunger slidably mounted in a bore 161 and adapted to engage the top of a rind located in the upper cone.

The cover 157 comprises a metal cover member which is fixedly mounted on the upper cone arm 137, and which has a front wall 162, rear wall 163, side walls 164 and 165, and a partially cylindrical top wall 166. The action of the ejector is as follows:

The spring 150 normally urges the ejector lever 151 upward inside the cover 157. When the upper cone is lifted by means of the handle 143, the ejector lever moves with it; and the rod 66a moves with it until the head 67a hits the bottom of the top wall 145 of the column. Then the ejector rod 66a pulls the ejector lever 151 downward to the position shown in dotted lines in Fig. 3, ejecting the rind from the upper cup.

The operation of the actuating mechanism of the fruit juicer is as follows: A half orange or similar fruit is placed upon the lower cone 133, with the handle 143 in the upper dotted line position, and the upper cone lifted far above the lower cone.

As the handle is drawn forward from the upper dotted line position to a forward position, or counterclockwise, in Fig. 3, the juicer head is drawn downward. In accordance with the principles involved in a sine curve, the amount of movement in relation to rotation of the shaft 125 increases gradually from position C (Fig. 4) to position G (Fig. 4). When the parts are in position B, the handle may be extending forwardly and upwardly; and the handle is then adapted to move the juicer head with maximum speed.

As the handle proceeds downward from this position to the lower dotted line position of Fig. 3, the amount of movement decreases; but the amount of force applied increases; and at the lower range of movement of the handle, shown in dotted lines at the left of Fig. 3, the handle is adapted to provide a maximum force for squeezing the juicer from the orange.

As the handle is again lifted and moved to the backward position of Fig. 3, the head 67a of ejector rod 66a hits the top of the column and actuates the ejector lever downward to eject the rind from the upper cup.

It will thus be observed that I have invented an improved actuating mechanism, by means of which a pivotally mounted handle may be caused to produce a maximum movement and a minimum force throughout a part of its range and also to produce a maximum force and a minimum movement throughout another part of its range.

This actuating mechanism is illustrated in connection with a fruit juicer, but may be used for many other applications where it is desired to apply a maximum force at the end of a stroke, which preferably has a faster movement, for bringing the working parts into the squeezing or forcing position.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an actuating mechanism for actuating a fruit juicer having a fixed cup on a cup supporting arm, with a fixed perforated cone and a movable cone having a central bore slidably mounting a rind ejector, the improvement which comprises a supporting column having a large stable base, and a reduced upper column extension provided with a rectangular guide aperture in its end wall, a sliding crosshead having a forwardly extending arm for supporting said movable cone, and having a depending rectangular bar sliding in said aperture, a transverse integral bearing carried by one side of said base, a shaft in said bearing and having an external handle and an internal crank, said crank being centrally located in said base, below said bar, a link pivotally connected to the lower end of said bar, and having its other end pivoted to the end of said crank, said handle extending forward and downward when said crank extends downward, said link causing rectilinear motion of said crosshead, guided by said bar sliding in said aperture whereby said crosshead is movable on an upstroke and a downstroke, said reduced column extension having a sliding rod located in said extension and in a second guide aperture in the end wall of said extension, said rod being provided with a lower head adapted to engage said end wall on the upstroke of said crosshead, and a lever pivoted on said crosshead and adapted to actuate said rind ejector, said rod passing through said lever and moving said lever downward at the end of the up-stroke of said crosshead when said lower head of said rod engages said end wall.

2. In an actuating mechanism for actuating a fruit juicer having a fixed cup on a cup supporting arm, with a fixed perforated cone and a movable cone having a central bore slidably mounting a rind ejector, the improvement which comprises a supporting column having a large stable base, and a reduced upper column extension provided with a rectangular guide aperture in its end wall, a sliding crosshead having a forwardly extending arm for supporting said movable cone, and having a depending rectangular bar sliding in said aperture, a transverse integral bearing carried by one side of said base, a shaft in said bearing and having an external handle and an internal crank, said crank being centrally located in said base, below said bar, a link pivotally connected to the lower end of said bar, and having its other end pivoted to the end of said crank, said handle extending forward and downward when said crank extends downward, said link causing rectilinear motion of said crosshead, guided by said bar sliding in said aperture whereby said head is movable on an upstroke and a downstroke, said reduced column extension having a sliding rod located in said extension and in a second guide aperture in the end wall of said extension, said rod being movable with said head and provided with a lower head adapted to engage said end wall near the end of the upstroke of said crosshead, and a lever pivoted on said crosshead and adapted to actuate said rind ejector, said rod passing through said lever and having a threaded member on the upper end thereof abutting said lever for moving said lever downward at the end of the up-stroke of said crosshead when said lower head of said rod engages said end wall, said rod having a coil spring mounted thereon below said lever and urging said lever upward against said threaded member on the end of said rod.

References Cited in the file of this patent

UNITED STATES PATENTS

| | | |
|---|---|---|
| 173,603 | Eastman | Feb. 15, 1876 |
| 330,929 | Rust | Nov. 24, 1885 |
| 747,567 | Ostrander | Dec. 22, 1903 |
| 1,053,590 | Gilchrist | Feb. 18, 1913 |
| 2,090,913 | Johnson | Aug. 24, 1937 |
| 2,174,909 | McColloch | Oct. 3, 1939 |
| 2,345,731 | Coyle | Apr. 4, 1944 |
| 2,522,800 | Quiroz | Sept. 19, 1950 |
| 2,591,162 | Kircher | Apr. 1, 1952 |

FOREIGN PATENTS

| | | |
|---|---|---|
| 222,816 | Switzerland | Nov. 2, 1942 |
| 461,819 | Canada | Dec. 20, 1949 |